United States Patent
Konno

(10) Patent No.: US 6,969,331 B2
(45) Date of Patent: *Nov. 29, 2005

(54) SYNTHETIC RESIN GUIDE FOR TRANSMISSION DEVICE

(75) Inventor: Masahiko Konno, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 226 days.

This patent is subject to a terminal disclaimer.

(21) Appl. No.: 10/348,571

(22) Filed: Jan. 21, 2003

(65) Prior Publication Data

US 2003/0144100 A1 Jul. 31, 2003

(30) Foreign Application Priority Data

Jan. 25, 2002 (JP) .............................. 2002-016992

(51) Int. Cl.$^7$ ............................................ F16H 7/08

(52) U.S. Cl. ..................................... 474/111; 474/140

(58) Field of Search ................... 474/111, 140; 29/453

(56) References Cited

U.S. PATENT DOCUMENTS

| | | | | |
|---|---|---|---|---|
| 4,826,468 A | * | 5/1989 | Friedrichs | 474/111 |
| 6,645,102 B2 | * | 11/2003 | Kumakura | 474/111 |
| 6,733,409 B2 | * | 5/2004 | Konno | 474/111 |
| 6,796,917 B2 | * | 9/2004 | Konno | 474/111 |
| 2002/0132688 A1 | | 9/2002 | Ono | |

* cited by examiner

*Primary Examiner*—David A. Bucci
*Assistant Examiner*—Bradley J. Van Pelt
(74) *Attorney, Agent, or Firm*—Howson and Howson

(57) ABSTRACT

A synthetic resin guide for a chain, or other flexible transmission medium comprises a synthetic resin guide body having a shoe on which the transmission medium slides, and a slotted, plate-receiving portion integrally molded on the back side of the shoe for receiving a reinforcing plate. The plate-receiving portion is composed of a pair of opposed, longitudinally extending, slot-defining walls. A convex pressing member, integrally molded with one of the walls protrudes into the slot through a partially cut-away portion of the wall and exerts a resilient pressing force on the reinforcing plate. The guide suppresses shock noises due to wobbling of the guide during operation. Increased molding tolerances are made possible, and higher productivity in the assembly of the guide is achieved.

11 Claims, 10 Drawing Sheets

SYNTHETIC RESIN GUIDE FOR TRANSMISSION DEVICE

FIELD OF THE INVENTION

This invention relates to a synthetic resin sliding contact guide for a power transmission utilizing an endless, circulating, flexible power transmission medium. It relates, for example, to a guide in a chain drive transmission, in which a chain transmits power from a driving sprocket to a driven sprocket, or to a guide in a belt drive transmission, in which a belt transmits power from a driving pulley to a driven pulley.

BACKGROUND OF THE INVENTION

In general, a chain or belt transmission device for valve timing in an internal combustion engine, or for transmitting rotational power in another drive mechanism, includes a chain or belt, which transmits power from a driving sprocket or pulley to one or more driven sprockets or pulleys. The transmission typically includes a pivotally mounted, movable, synthetic resin guide, which cooperates with a tensioner as a tensioner lever, and a fixed synthetic resin guide used as a guide rail for the chain or belt. The movable guide and the fixed guide are attached to a frame of the engine or other drive mechanism by suitable pins, or by bolts or similar mountings. The guides make sliding contact with the chain or belt to apply appropriate tension thereto, and also prevent widthwise vibration and widthwise movement of the chain or belt, which might cause it to run off the guides.

FIGS. 8 and 9 depict a well known, conventional sliding contact guide 500. The guide comprises a synthetic resin guide body 510, which includes a shoe 511 having a front surface on which a traveling chain slides and a plate-receiving portion 512 on the back side of the shoe. The plate-receiving portion is composed of a pair of walls 512*a* provided on the back of the shoe 511 and extending in the longitudinal direction of the guide. These walls are spaced from each other to define between them a longitudinally extending slot, which opens in a direction facing away from the shoe. A metallic reinforcing plate 520 is fitted between the slot walls 512*a* as depicted, for example, in Japanese patent application No. 2000-322380.

As shown in FIGS. 8 and 9, the reinforcing plate has a hole 521 for receiving a pin or bolt on which the guide is pivoted, a tensioner-contacting portion 522, and a pair of locking holes 523. The synthetic resin guide body 510 is a complicated structure, comprising a shoe 511, on which a chain slides, and a slotted plate-receiving portion composed of walls 512*a*, a mounting hole 512*b*, a boss 512*c*, outer reinforcing ribs 512*d* for strengthening the guide, a tensioner contacting portion 512*e*, and tongues 512*f* for locking engagement with the holes 523 in the reinforcing plate 520.

As illustrated in FIG. 10, in the molding process, the synthetic resin guide body 510 becomes warped through thermal shrinkage due to local variations in the rate of cooling. Warpage takes place in the directions depicted by arrows Y, and results in the formation of gaps S, as shown in FIG. 11, between the walls 512*a* of the slot and the reinforcing plate 520. As shown in FIG. 11, the width of these gaps increases so that the gaps are wider near the opening of the slot.

The mold draft, provided in order to facilitate removal of the finished guide body from the mold, contributes to the divergence of the gaps S. The gaps cause the metallic reinforcing plate 520 to fit loosely in the guide body 510, and shock noise occurs due to wobbling between the guide body 510 and the reinforcing plate 520 as a chain travels over the guide. The wobbling movement of the reinforcing plate and guide body leads to a significant reduction in the life of the guide.

If the slot gap S is made small in order to avoid the above-described problems, it becomes more difficult to insert the metallic reinforcing plate 520 into the guide body 510, and assembly of the guide becomes more difficult and time-consuming. The result is a significant reduction in productivity.

The slot gap in the guide body 510, and the thickness of the reinforcing plate 520 are ideally the same size. However, to mold these parts in the same size is difficult. For example, if the slot gap S is 0.1 mm, the metallic reinforcing plate 520 wobbles. On the other hand, if the thickness of the reinforcing plate 520 is 0.1 mm larger than the width of the slot the reinforcing plate either cannot be inserted into the guide body, or can be inserted only by the use of an excessive inserting force. Thus, excessive accuracy in molding, and very close dimensional tolerances were required.

Accordingly, objects of the invention are to solve the above-described problems of the prior art, and to provide a synthetic resin guide for a flexible power transmission medium, which can suppress shock noise due to the wobbling, and which can be produced inexpensively and with high productivity, without the need to maintain close dimensional tolerances in molding.

SUMMARY OF THE INVENTION

The synthetic resin guide in accordance with this invention comprises an elongated synthetic resin guide body, including a shoe extending along the longitudinal direction of the guide body. The shoe having a front surface arranged to contact a transmission medium, and a back side. A plate-receiving portion, provided on the back side of the shoe, is integrally molded as a unit with the shoe, and extends along the longitudinal direction of the guide body. The plate-receiving portion comprises a pair of opposed walls extending along the longitudinal direction of the guide body and defining a slot between them. A reinforcing plate is fitted in the slot between said opposed walls. The improvement comprises a convex pressing member integrally molded as a unit with one of the walls, and protruding into the slot through an opening formed in said one of the walls, and resiliently pressing against the reinforcing plate.

In one embodiment, the reinforcing plate is engaged on one side by the pressing member, and on its opposite side by the other wall. In another embodiment, a second convex pressing member is integrally molded as a unit with the other wall, protrudes into the slot through an opening formed in said other wall, and resiliently presses against the reinforcing plate, so that the first and second pressing members are engaged with the reinforcing plate on opposite sides thereof. The first and second pressing members may be directly opposed to each other or offset from each other along the longitudinal direction of the guide body.

The guide body preferably has a mounting hole adjacent one end thereof, and the reinforcing plate has a hole adjacent one end thereof and in register with the mounting hole, so that the holes can receive a mounting pin, and the guide body and reinforcing plate can be held together in part by the engagement of their holes with the mounting pin.

In a preferred embodiment, a positioning recess is formed in the reinforcing plate, and the convex pressing member is engaged with the recess.

The guide may be a fixed guide for guiding and tensioning a power transmission medium such as a chain, belt or the like, or a movable guide, such as a pivoted tensioner lever which cooperates with the plunger of a tensioner.

The materials of the synthetic resin guide body are not especially limited. However, nylon 6, nylon 66, nylon 46, all aromatic nylons and the like, known as engineering plastics, have excellent wear and lubricating properties, and are preferably used. The transmission medium can slide easily on the surface of the shoe when the guide is composed of these materials. When bending rigidity, toughness and strength are required, fiber-reinforced plastics are preferred.

The materials of the reinforcing plate is likewise not especially limited. Iron based metals, nonferrous metals such as aluminum, magnesium, titanium and the like, engineering plastics, fiber-reinforced plastics and the like, having good bending rigidity and strength are preferred. Furthermore, the form of the reinforcing plate is not especially limited, provided that the plate can be fitted into the slot of the guide body to reinforce the guide body. For example, the reinforcing plate may have one or more cut-out openings or windows for weight reduction.

The principal function of the synthetic resin guide is to guide and maintain tension in a flexible power transmission medium which is in sliding contact with the shoe portion of the synthetic resin guide body, and to suppresses widthwise vibration and prevent widthwise movement of the transmission medium off the guide. The convex pressing member, which protrudes into the slot is pushed outward by the inserted reinforcing plate and, because of its resilience, exerts a reaction force against the reinforcing plate, holding it reliably in the slot, preventing it from being dislodged from the guide body, and suppressing vibration of the reinforcing plate in the guide body. Accordingly, the dimensional tolerances of the slot width and the width of the reinforcing plate are less critical than in the case of a conventional reinforced synthetic resin guide. Furthermore, if a positioning recess is provided in the reinforcing plate to receive the convex pressing member, proper positioning of the reinforcing member can be achieved and maintained.

With the mounting hole in the guide body and the hole in the reinforcing plate both engaged with a mounting pin, the reinforcing plate cannot become dislodged from the guide body, and contact vibration between the guide body and the reinforcing plate is further suppressed.

DETAILED DESCRIPTION OF THE PREFERRED EMBODIMENTS

Figure 1:
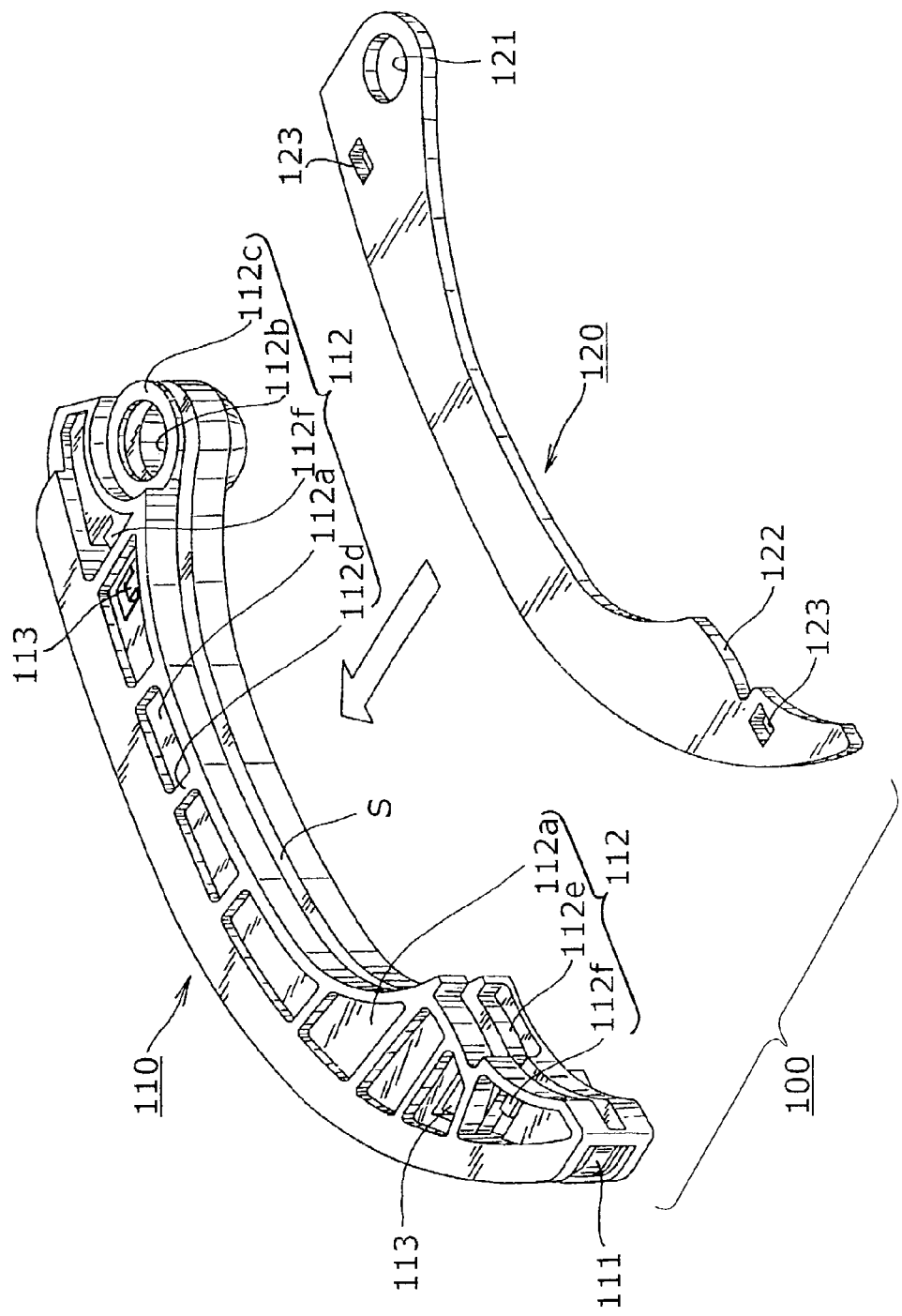
FIG. 1 is an exploded perspective view of a synthetic resin guide in accordance with a first embodiment of the invention.
Figure 2:
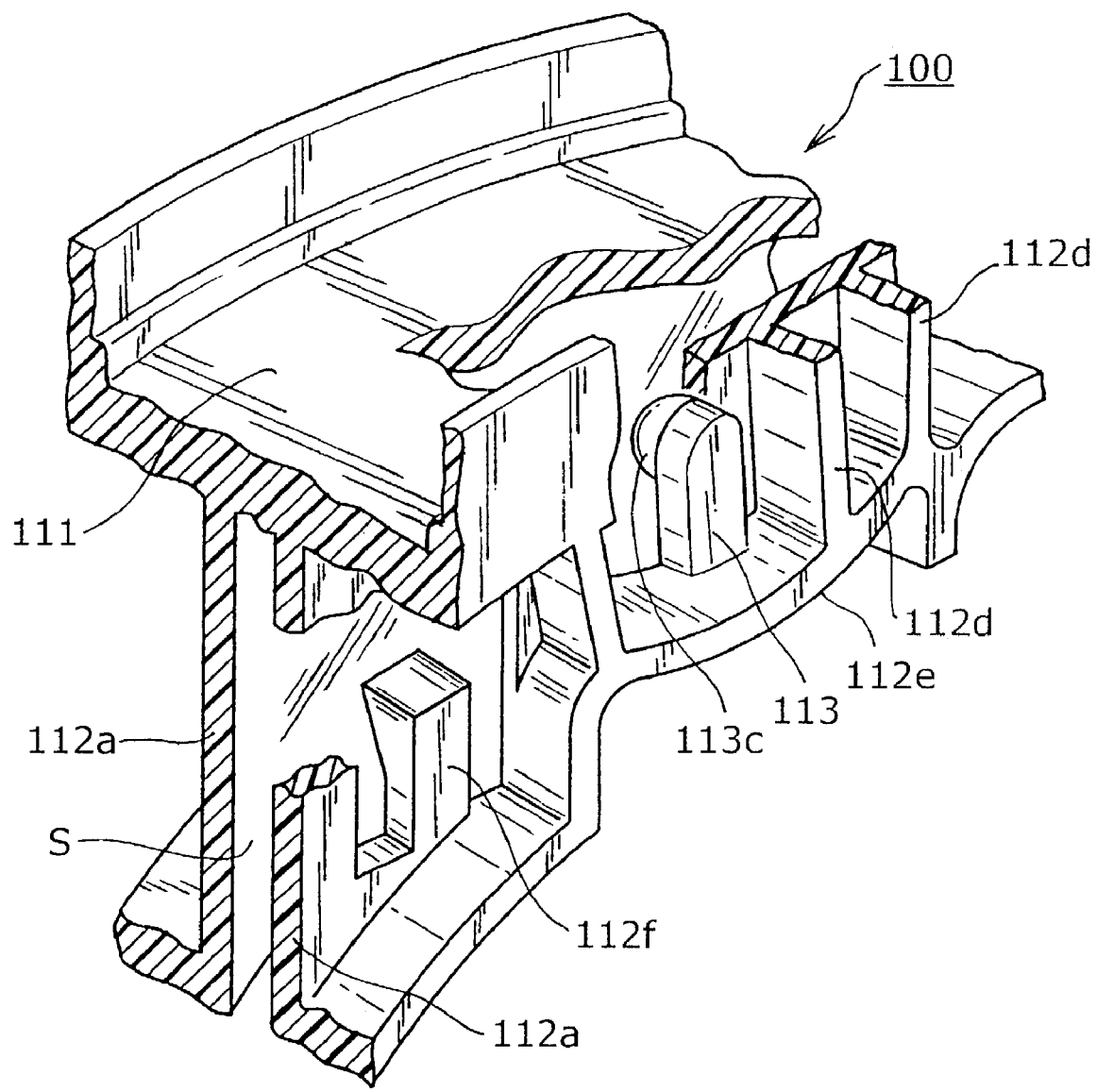
FIG. 2 is a fragmentary, partially cut-away, perspective view of the guide of FIG. 1.

As shown in FIGS. 1 and 2, a pivoted synthetic resin guide 100 is a two piece structure comprising an integrally molded synthetic resin guide body 110, and a metallic reinforcing plate 120 punched from a steel sheet. The guide is produced by incorporating the reinforcing plate 120 into the guide body 110 in the direction of the arrow as shown in FIG. 1.

The guide body 110 comprises a shoe 111, having a sliding surface on which a traveling chain slides, and a plate-receiving portion 112, composed of a pair of opposed walls 112a which are integrally molded as a unit with the shoe on the back side of the shoe 111. These walls extend along the longitudinal direction of the guide, forming between them a slot S for receiving a reinforcing plate 120. The plate-receiving portion 112 includes a boss 112c having a mounting hole 112b for mounting the guide on the frame of an engine, a plurality of reinforcing ribs 112d for reinforcing the guide body structure, a tensioner contacting portion 112e, and tongues 112f, which lock the reinforcing plate 120 in place in the guide body by engagement with holes 123 in the reinforcing plate.

The characteristic feature of the movable guide 100 is the convex pressing member 113 shown in FIG. 2. This pressing member protrudes into slot S through a cut-away opening in one of the walls 112a, with which it is integrally molded. The pressing member resiliently presses against the reinforcing plate 120, so that the plate is sandwiched between the convex pressing member 113 on the one side, and, on the other side, the opposite wall 112a, one or more similar pressing members formed on the opposite wall, or both the opposite wall and one or more pressing members formed thereon. Even if a gap exists within the slot S, between the reinforcing plate and the walls of the plate-receiving portion of the guide, the convex pressing member 113 protruding into said slot S makes contact with the reinforcing plate 120 so that a reaction force is produced due to resilient bending of the pressing member. This reaction force causes the pressing member to press the reinforcing plate 120 holding it reliably, and preventing it from being dislodged from the guide body.

Figure 3A:
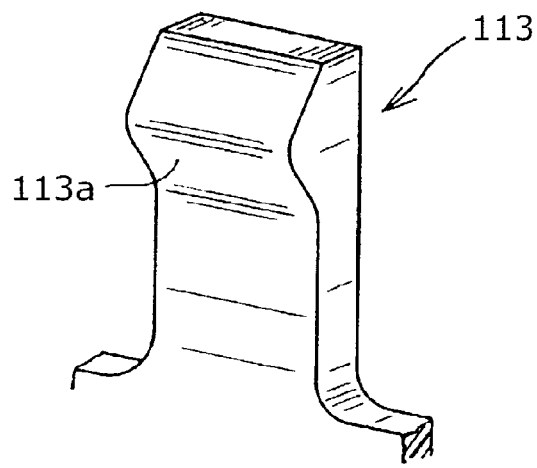
FIGS. 3(a), 3(b) and 3(c) perspective views of different versions of convex pressing members used in the guide, FIG. 3(a) showing a tapered pressing surface, FIG. 3(b) showing a cylindrical pressing surface, and FIG. 3(c) showing a spherical pressing surface.
Figure 3B:
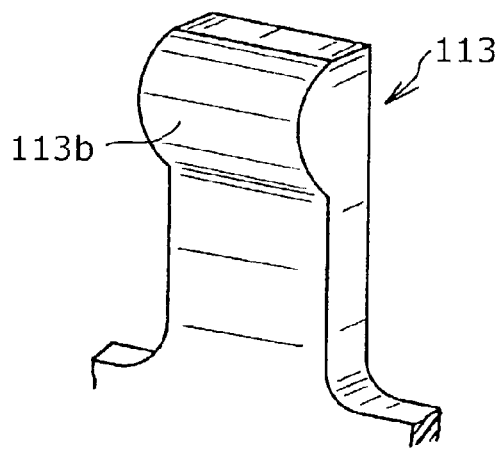
Figure 3C:
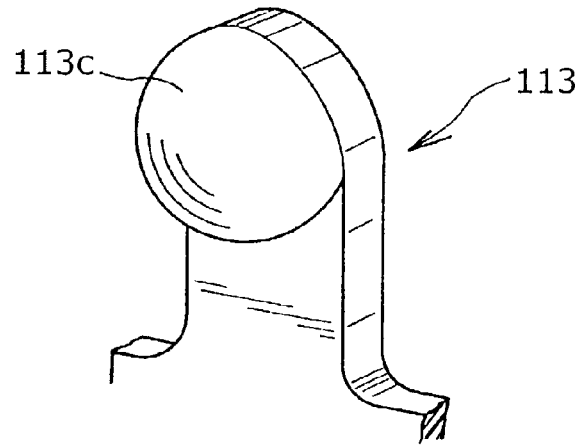

The shape of the convex pressing member 113 may be selected from any of various shapes. For example, the pressing surface can be a blunt, tapered surface 113a as shown FIG. 3(a), a cylindrical surface 113b, as shown in FIG. 3(b), a spherical surface 113c as shown in FIG. 3(c), or any of various similar convex surfaces.

Figure 4A:
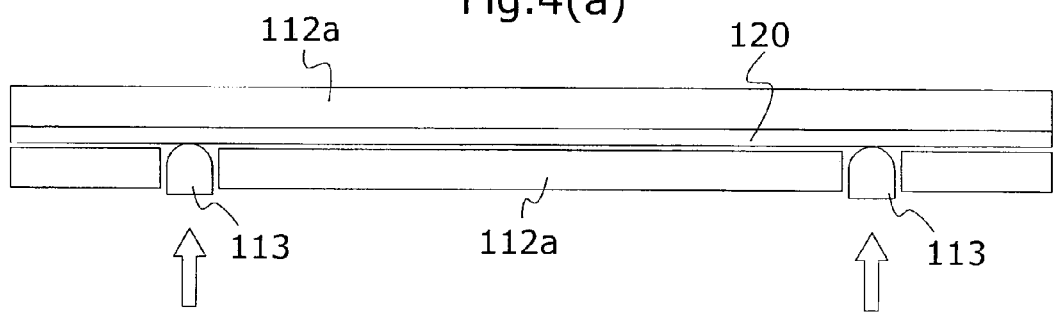
FIGS. 4(a), 4(b) and 4(c) are plan views showing different arrangements of convex pressing members in a guide, FIG. 4(a) showing a guide in which all of the pressing members are situated on one side of the reinforcing plate, FIG. 4(b) showing pressing members on both sides of the plate, but offset longitudinally from one another, and FIG. 4(c) showing pressing members on both sides of the plate, in pairs, with the pressing members of each pair being in direct opposition to each other.
Figure 4B:
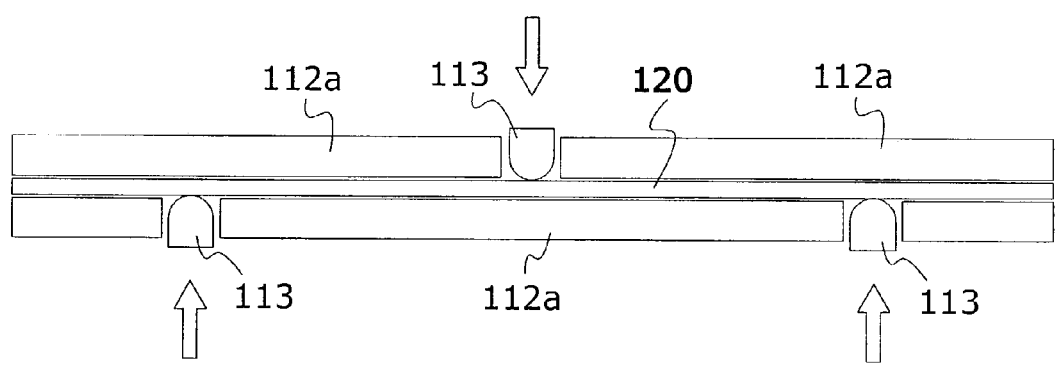
Figure 4C:
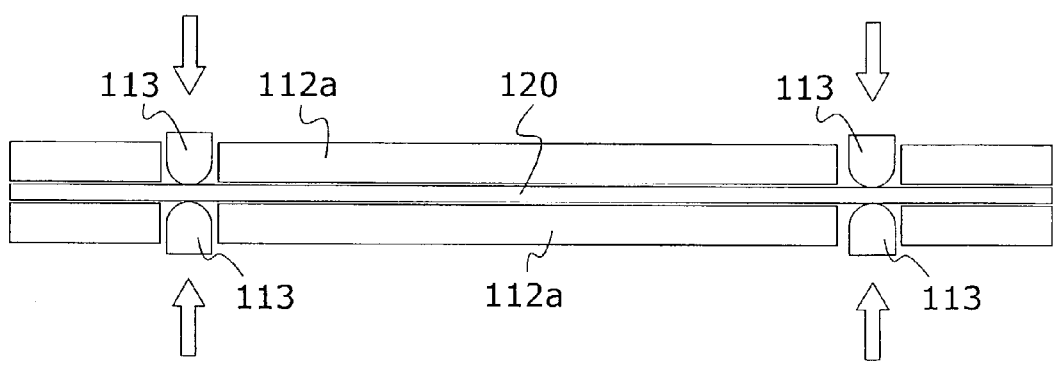

The guide body will preferably have plural convex pressing members 113, which can be in any of various arrangements. Exemplary arrangements are depicted in FIGS. 4(a), 4(b) and 4(c). In the arrangement shown in FIG. 4(a), the convex pressing members 113 are in only one of the walls, and situated on only one side of the reinforcing plate. In the arrangement shown in FIG. 4(b), pressing members are in both walls and on both sides of the plate, but the pressing members on opposite sides are longitudinally offset, In the arrangement shown in FIG. 4(c), again pressing members are situated in both walls and on both sides of the plate. However, the pressing members are disposed in pairs, with the pressing members of each pair being on opposite sides of the plate and directly opposed to each other.

The reinforcing plate 120 includes a hole 121, which receives a mounting pin or bolt (not shown) together with the mounting hole 112b in the guide body 110. The plate also has a a tensioner contacting portion 122, which makes contact with a plunger of a tensioner attached to an engine frame (not shown) to control the tension in a chain. The locking holes 123, receive tongues 112e in the guide body 110. Therefore, when the guide 100 is mounted on an engine frame, the reinforcing plate 120 is prevented from being dislodged from the guide body 110.

Even if there is a difference in thermal expansion coefficients between the synthetic resin guide body 110 and the reinforcing plate 120, the holes 112b and 121, which receive a mounting pin or bolt, are adjacent one end of the guide, and the plate and guide body are otherwise free to expand and contract relative to each other in the longitudinal direction. Consequently thermal deformation and breakage of the guide body and the reinforcing plate are avoided.

Figure 5A:
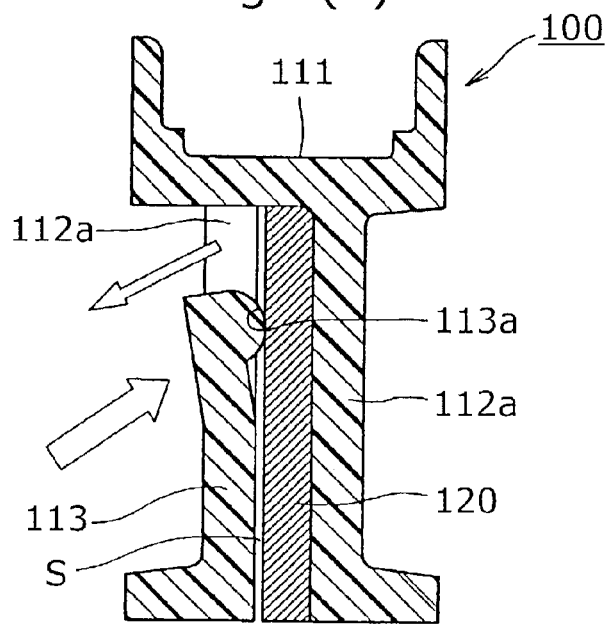
FIGS. 5(a), 5(b) and 5(c) are transverse cross-sectional views of the guide, showing different reinforcement plate configurations, FIG. 5(a) showing a pressing member engaged with a reinforcing plate having no positioning recess, FIG. 5(b) showing a pressing member engaged with a reinforcing plate having a positioning recess in the form of a through hole, and FIG. 5(c) showing a pressing member engaged with a reinforcing plate having a positioning recess in the form of a concavity formed in a side of the reinforcing plate.
Figure 5B:
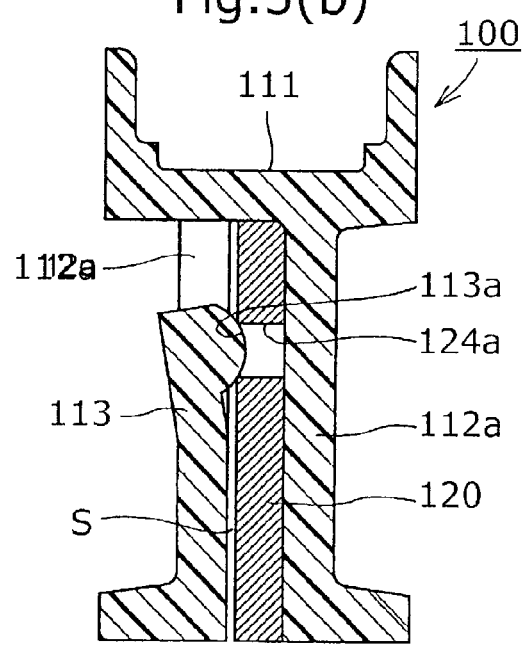
Figure 5C:
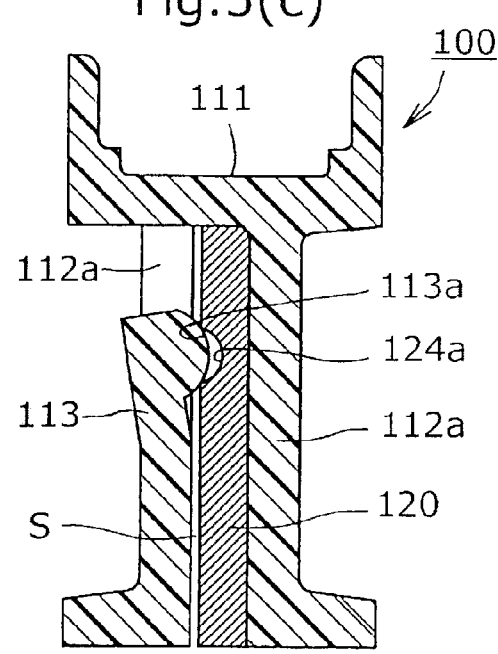

The convex pressing member 113 may simply press against the reinforcing plate 120 as shown in FIG. 5(a), or may be engaged with a positioning recess as shown in FIGS. 5(b) and 5(c). As shown in FIG. 5(b), a convex pressing member 113 may be engaged with a positioning hole 124a in the reinforcing plate 120. As shown in FIG. 5(c), the convex pressing member 113 may be engaged with a concavity 124b formed in the reinforcing plate 120. In the case of FIGS. 5(b) and 5(c), the positioning recess is formed in the reinforcing plate, preferably at a location such that the pressing member enters the recess when the plate is fully inserted into the slot in the guide body, that is, when the plate is in contact with the back side of the shoe, and in the proper longitudinal position such that the pin-receiving holes in the plate and guide body are in register with each other. The dimensional tolerances for molding of the guide can be increased, and the guide can be produced inexpensively and with high productivity.

The synthetic resin guide 100 for the transmission device of the first embodiment exhibits significantly improved bending rigidity, toughness, strength and wear properties. As a result, it can apply appropriate tension to a transmission medium, and can ensure stable travel of the transmission medium while avoiding widthwise vibration and widthwise movement of the transmission medium off the guide. Additionally, even if gaps exists in slot S, between the walls 112a and the reinforcing plate 120, the convex pressing member 113, protruding into the slot S, makes contact with the reinforcing plate 120, and exerts a resilient reaction force on the plate, so that the plate is reliably held in the guide body without being dislodged. Thus, even if the dimensional tolerances for molding of the guide are increased, shock noise, which is generated due to wobbling of the guide, is suppressed.

In the case where the convex pressing member 113 is engaged with a positioning hole 124a or positioning concavity 124b formed in the reinforcing plate 120, the reinforcing plate 120 is reliably positioned in the guide. Even if the dimensional tolerances for molding of the guide are increased, significantly improved assembly accuracy can be achieved inexpensively.

Figure 6:
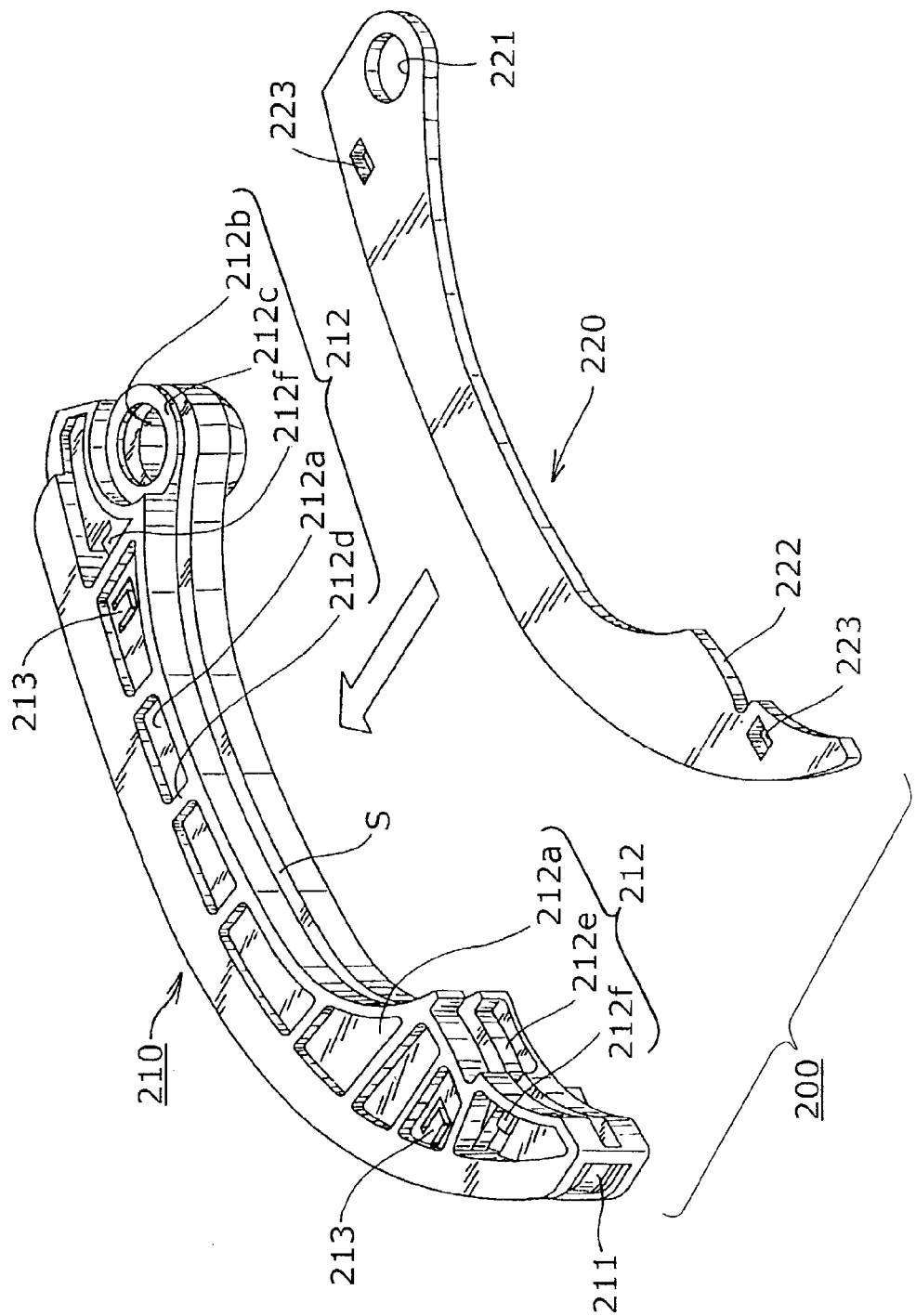
FIG. 6 an exploded perspective view of a synthetic resin guide in accordance with another embodiment of the invention.
Figure 7:
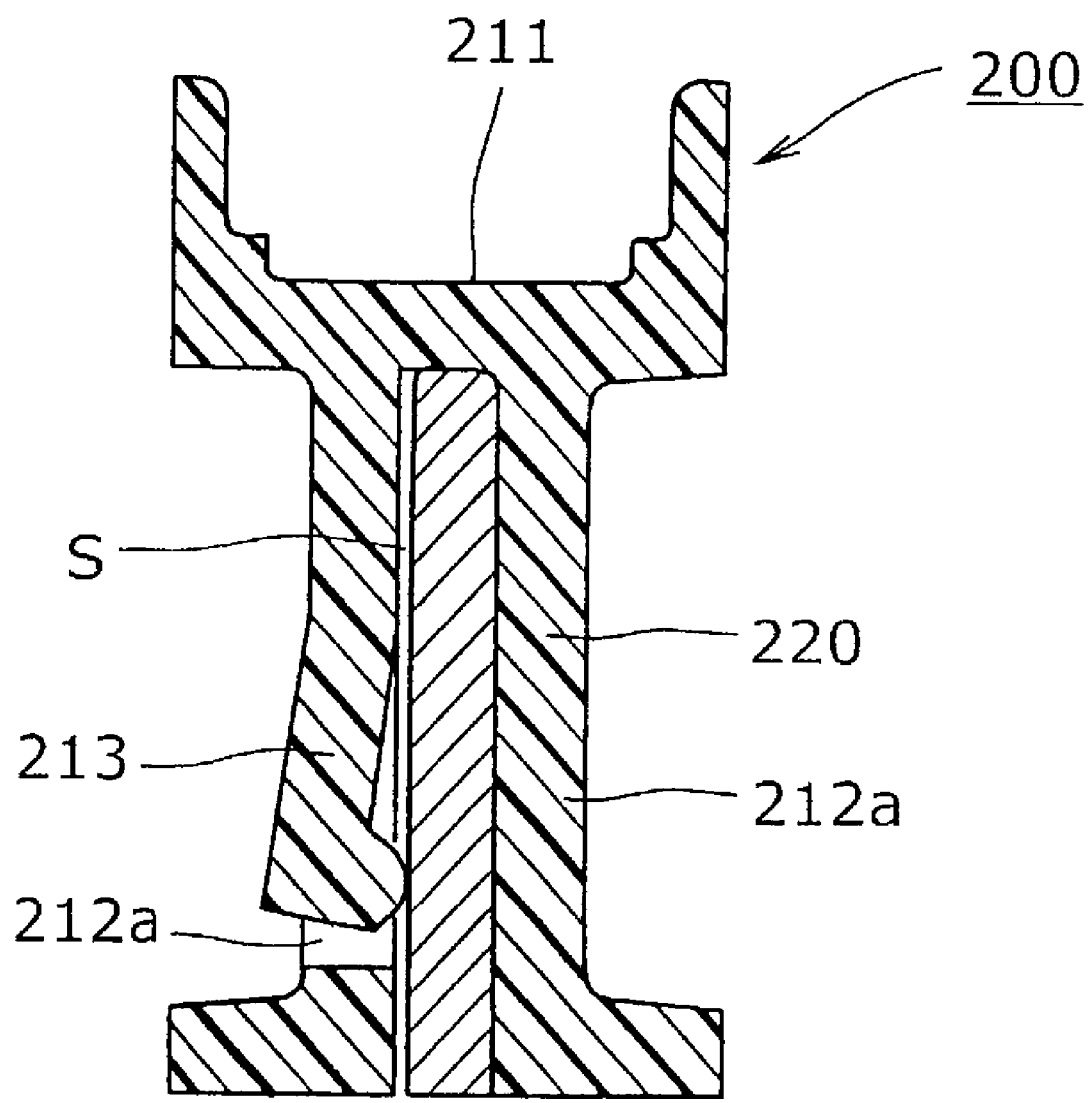
FIG. 7 is a cross-sectional view showing details of the pressing member in the embodiment of FIG. 6.
Figure 8:
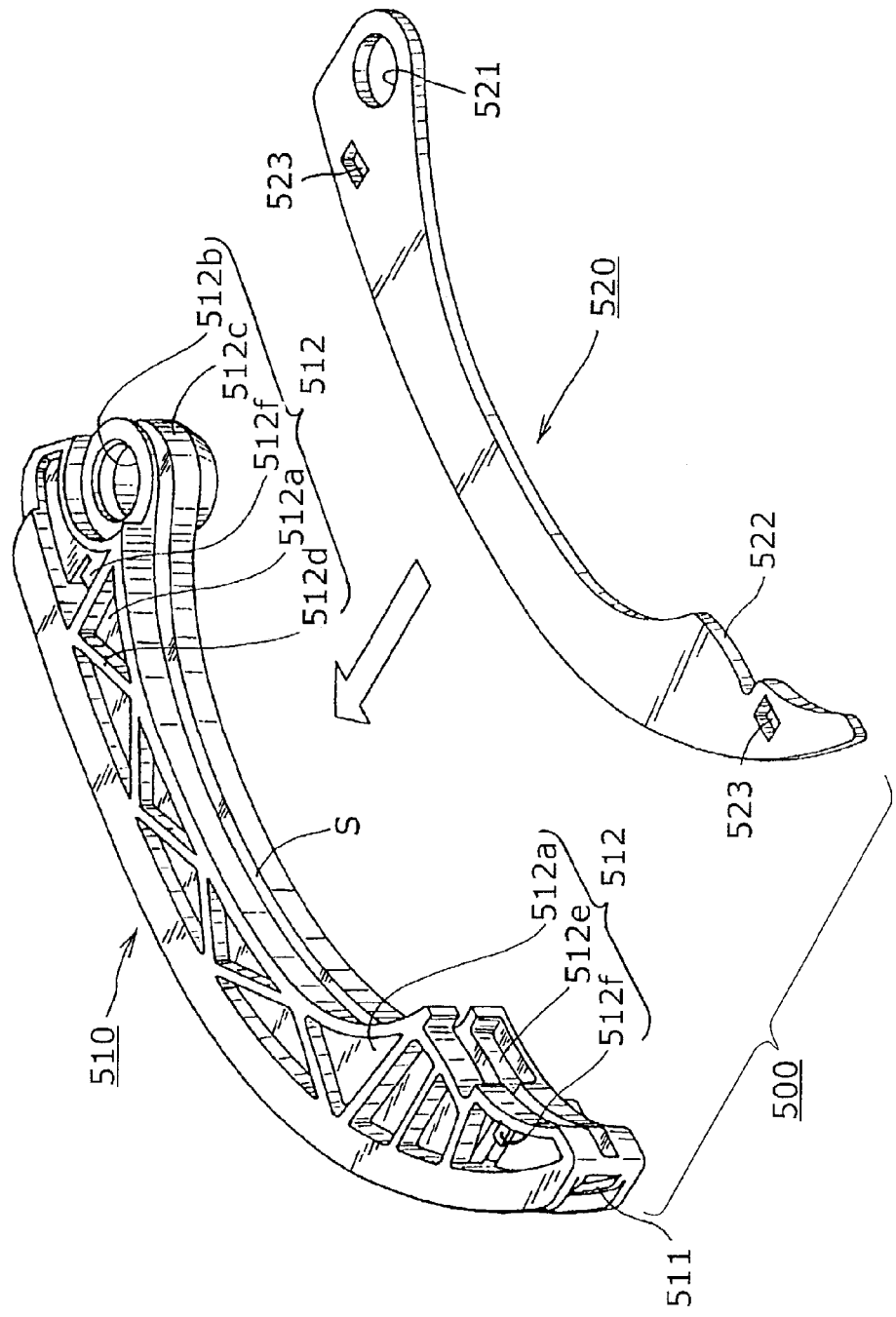
FIG. 8 an exploded perspective view of a conventional synthetic resin guide.
Figure 9:
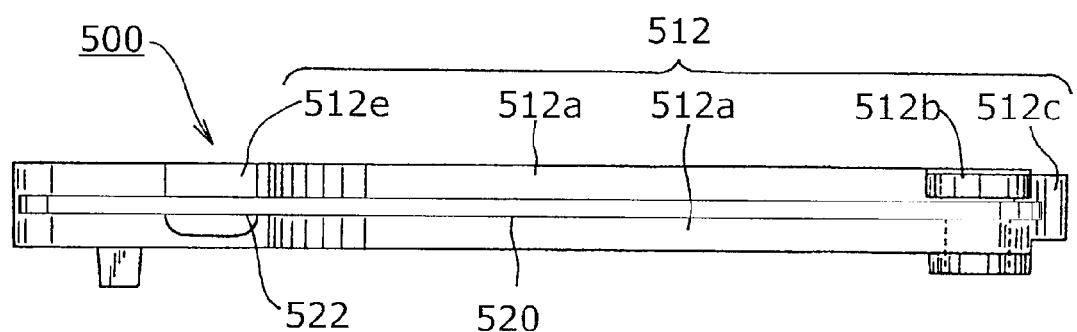
FIG. 9 is an elevational view of the conventional synthetic resin guide of FIG. 8.
Figure 10:
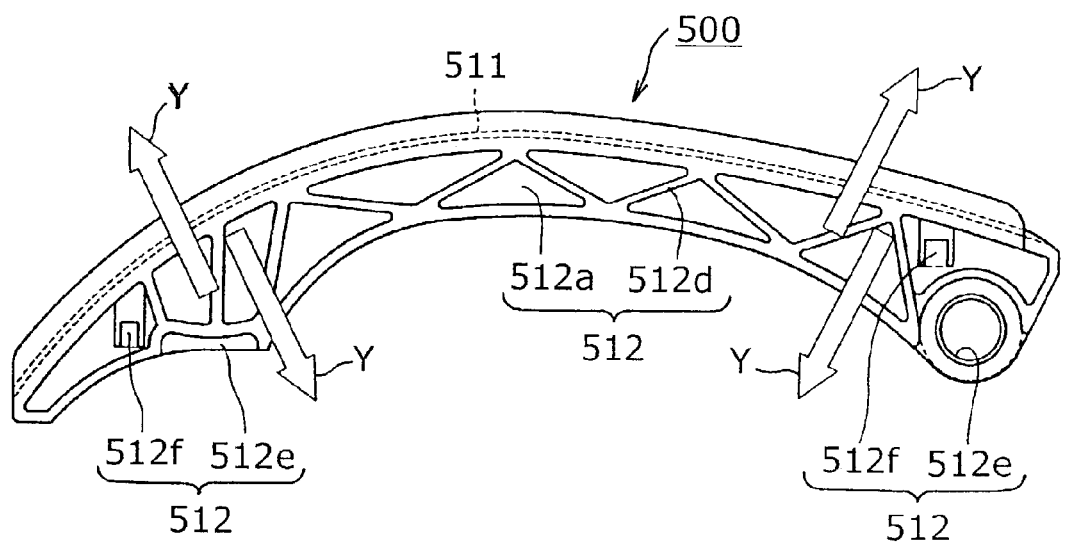
FIG. 10 is an elevational view illustrating strain due to thermal shrinkage in a conventional synthetic resin guide.
Figure 11:
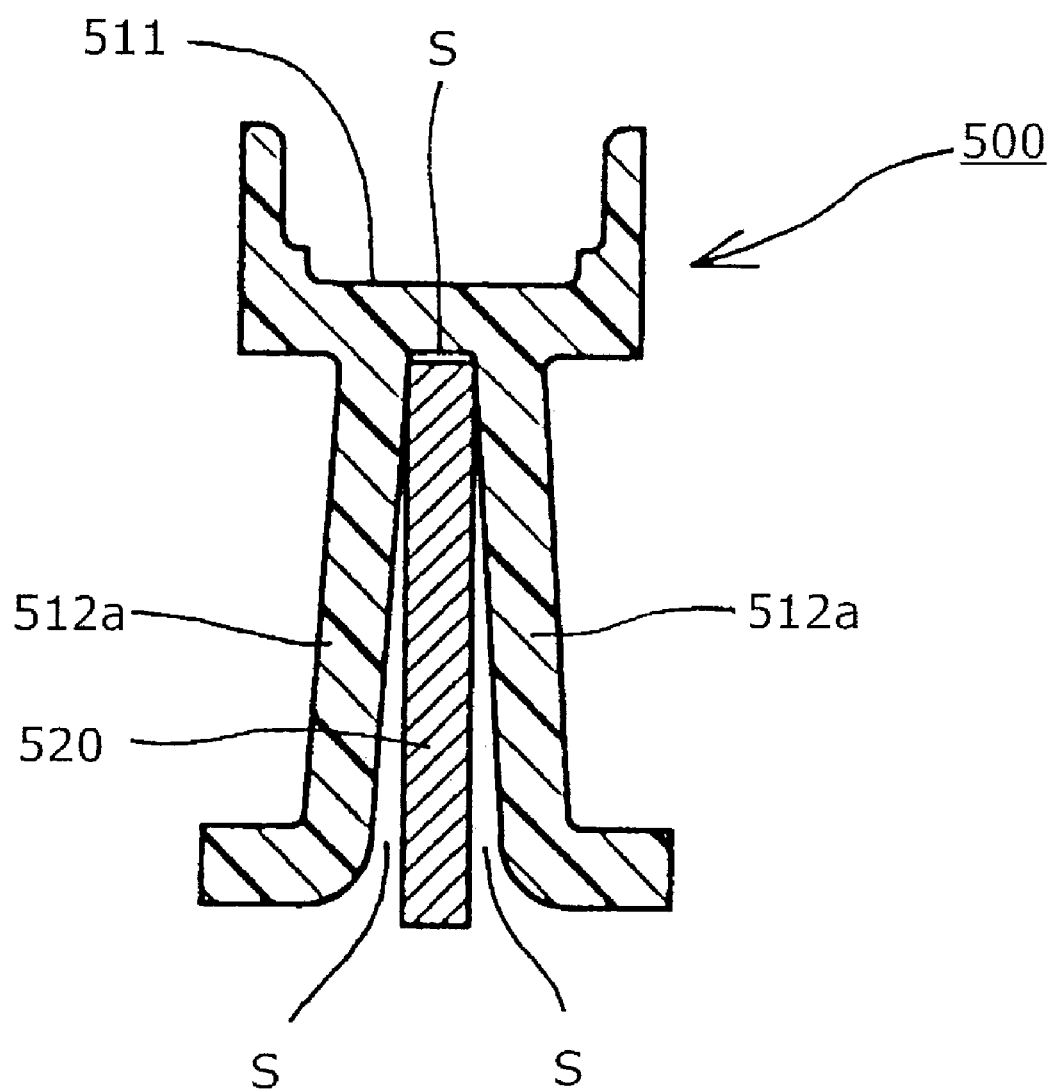
FIG. 11 is a sectional view illustrating the mold draft in a conventional synthetic resin guide.

In the second embodiment of the invention, shown in FIGS. 6 and 7, a synthetic resin guide 200 has a convex pressing member 113 which is integrally molded with one of the walls 212a. The wall is partially cut away so that the pressing member 213 extends, from the location at which it joins the wall, toward the opening of the slot. Here again, even if the dimensional tolerances for molding the guide are increased, shock noise can be suppressed, and the guide can be produced inexpensively and with high productivity.

The guide according to the invention has a reinforcing plate inserted into a plate-receiving slot formed between a pair of walls. Accordingly, the bending rigidity of the entire guide, its toughness, its strength and its wear properties can be significantly improved. The guide can be attached to a transmission device such as an engine, or other machine requiring a traveling, flexible, power transmission medium, and can apply appropriate tension to the transmission medium. As a result stable operation, without widthwise vibration and without widthwise movement of the transmission medium off the guide, is ensured.

With a convex pressing member, integrally molded with a wall of a plate-receiving member, and protruding into a plate-receiving slot through a cut-out portion of the wall, even the dimensional tolerances in the slot are large, the pressing member presses against the reinforcing plate with a resilient reaction force. Consequently the reinforcing plate is reliably held, without dislodging from the synthetic resin guide body. Moreover, even if the dimensional tolerances in the molding of the guide are relatively large, shock noise, generated due to wobbling of the guide, can be suppressed.

When the convex pressing member is engaged in a positioning recess consisting of a concavity or a through hole formed in the reinforcing plate, the plate is in its proper position in the guide body. The dimensional tolerances can be relatively large, and a synthetic resin guide can be produced inexpensively and with high productivity.

When a hole in the reinforcing plate is in register with a mounting hole in the guide body, and both holes receive a mounting pin, bolt or the like, the reinforcing plate will not become dislodged from the guide body, and contact vibration between the guide body and the reinforcing plate, is suppressed. Furthermore, even if there is a difference in thermal expansion coefficients between the synthetic resin guide body and the reinforcing plate, the reinforcing plate is free to move in the longitudinal direction relative to the guide body, so that the thermal deformation of the plate and guide body does not occur, and the plate and guide body are not broken due to thermal effects.

I claim:

1. A synthetic resin guide for a flexible transmission medium comprising an elongated synthetic resin guide body, said guide body including a shoe extending along the longitudinal direction of the guide body, said shoe having a front surface arranged to contact a transmission medium, and a back side, and a plate-receiving portion provided on said back side of the shoe and integrally molded as a unit with said shoe, the plate-receiving portion also extending along the longitudinal direction of the guide body and comprising a pair of opposed walls extending along the longitudinal direction of the guide body and defining a slot between them, and a reinforcing plate fitted in said slot, between said opposed walls, wherein the improvement comprises a convex pressing member integrally molded as a unit with one of said walls, said pressing member protruding into said slot through an opening formed in said one of said walls, and resiliently pressing against said reinforcing plate.

2. A synthetic resin guide according to claim 1, in which said reinforcing plate is engaged on one side by said pressing member on said one of said walls, and on its opposite side by the other of said walls.

3. A synthetic resin guide according to claim 1, having a second convex pressing member integrally molded as a unit with the other of said walls, said second convex pressing member protruding into said slot through an opening formed in said other of said walls, and resiliently pressing against said reinforcing plate, whereby said first and second pressing members are engaged with said reinforcing plate on opposite sides thereof.

4. A synthetic resin guide according to claim 1, having a second convex pressing member integrally molded as a unit with the other of said walls, said second convex pressing member protruding into said slot through an opening formed in said other of said walls, and resiliently pressing against said reinforcing plate, whereby said first and second pressing members are engaged with said reinforcing plate on opposite sides thereof, and wherein said first and second pressing members are directly opposed to each other.

5. A synthetic resin guide according to claim 1, having a second convex pressing member integrally molded as a unit with the other of said walls, said second convex pressing member protruding into said slot through an opening formed in said other of said walls, and resiliently pressing against said reinforcing plate, whereby said first and second pressing members are engaged with said reinforcing plate on opposite sides thereof, and wherein said first and second pressing members are offset from each other along the longitudinal direction of the guide body.

6. A synthetic resin guide according to claim 1, in which said guide body has a mounting hole adjacent one end thereof, and said reinforcing plate has a hole adjacent one end thereof and in register with said mounting hole, whereby said holes can receive a mounting pin and said guide body and reinforcing plate can be held together in part by the engagement of said holes with the mounting pin.

7. A synthetic resin guide according to claim 1, in which a positioning recess is formed in said reinforcing plate, and in which said convex pressing member is engaged with said recess.

8. A synthetic resin guide for a transmission device according to claim 7, in which said guide body has a mounting hole adjacent one end thereof, and said reinforcing plate has a hole adjacent one end thereof and in register with said mounting hole, whereby said holes can receive a mounting pin and said guide body and reinforcing plate can be held together in part by the engagement of said holes with the mounting pin.

9. A synthetic resin guide for a flexible transmission medium comprising an elongated synthetic resin guide body, said guide body including a shoe extending along the longitudinal direction of the guide body, said shoe having a front surface arranged to contact a transmission medium, and a back side, and a plate-receiving portion provided on said back side of the shoe and integrally molded as a unit with said shoe, the plate-receiving portion also extending along the longitudinal direction of the guide body and comprising a pair of walls extending along the longitudinal direction of the guide body, said walls being spaced from each other and having opposed faces defining a slot between them, and a reinforcing plate fitted in said slot, between said opposed faces, said slot having an opening extending in the longitudinal direction of the guide body wide enough to allow said reinforcing plate to be inserted into said slot during assembly of the guide, wherein the improvement comprises a holding structure for holding said reinforcing plate, and suppressing vibration thereof in said slot, said holding structure comprising an opening formed in one of said walls, said opening in one of the walls extending through said one of said walls from the slot-defining face thereof to an external face thereof on a side of said wall opposite from said slot-defining face, and a convex pressing member integrally molded as a unit with said one of said walls, said pressing member protruding into said slot through said opening formed in said one of said walls, and resiliently pressing against said reinforcing plate.

10. A synthetic resin guide according to claim 9, in which said reinforcing plate is engaged on one side by said pressing member on said one of said walls, and on its opposite side by the slot-defining face of the other of said walls.

11. A synthetic resin guide according to claim 10, in which said guide body has a mounting hole adjacent one end thereof, and said reinforcing plate has a hole adjacent one end thereof and in register with said mounting hole, whereby said holes can receive a mounting pin and said guide body and reinforcing plate can be held together in part by the engagement of said holes with the mounting pin.

\* \* \* \* \*